United States Patent Office

3,600,494
Patented Aug. 17, 1971

3,600,494
SEROLOGICAL TEST FOR SYPHILIS
Takayuki Tomizawa and Koichiro Fujita, Tokyo, Japan, assignors to Fujizokiseiyaku Kabushikikaisha, Tokyo, Japan
No Drawing. Filed Nov. 6, 1967, Ser. No. 680,979
Int. Cl. G01n *31/02, 33/16*
U.S. Cl. 424—13
2 Claims

ABSTRACT OF THE DISCLOSURE

A serological test for syphilis based on a carrier agglutination reaction is disclosed. The test includes the treatment of the serum test sample with a solution containing non-pathogenic strains of *Treponema pallidum* cell components and normal rabbits' testes components to absorb heterogenic antibodies. The treated serum sample is then reacted with a new antigen preparation comprising a suspension of *Treponema pallidum* sensitized carriers in a phosphate buffered saline solution.

BACKGROUND OF THE INVENTION

This invention is concerned with the serodiagnosis of syphilis. The invention provides a serological test for syphilis based on a carrier agglutination reaction that is practical for large scale clinical testing and is substantially more reliable than the clinical tests presently in widespread use.

Syphilitic patients fall into two general categories namely, those with typical clinical manifestations of the diseases and those with latent forms of the disease. Once detected, the treatment of syphilis with antibiotics is very effective, and in recent years has resulted in a considerable reduction in the number of patients with syphilis. The diagnosis of the disease in patients falling into the first category is a relatively simple matter, because of the readily observable manifestations. Diagnosis of the disease in patients falling into the second category is more difficult since serological tests, which at present are not wholly reliable, must be relied upon.

The serological tests for syphilis presently in widespread use are subject to the so-called non-specific reaction. This is a biologically false positive reaction which results when testing the serum of a patient who does not have and never has had syphilis. In a comparative study which will be subsequently described in detail, the incidence of biological false positive reaction was found to be one out of every five patients giving a positive reaction to the most commonly used Wasserman test, the Cardiolipin method. In this same comparative study, it was also found that the Cardiolipin method gave erroneous results when testing syphilitic serum in two out of the 100 samples tested. The serological test of the invention, under the same conditions, showed a complete absence of the biologically false positive reaction and gave positive results in all of the syphilitic serum samples tested.

The serodiagnosis of syphilis was originated by Wasserman by his application of the complement fixation test established by Bordet and Gengon to the diagnosis of syphilis. In its initial development, Wasserman's test used an extract from the liver of congenital syphilitic infants as antigen. This particular extract was used as antigen since it contained cells of *Treponema pallidum*, the causing agent of syphilis, which play an essential role in the specific antigen-antibody reaction involved in Wasserman's test.

Subsequent investigations into the Wasserman reaction revealed that bovine heart extract could be successfully used as the antigen in place of the syphilitic infant's liver extract originally used. It was discovered that the activity of the bovine heart extract was due to lipoid substances and, in particular, the phospholipid Cardiolipin. The use of Cardiolipin as antigen together with technical improvements in clinical testing methods led to widespread use of this variation of Wasserman's basic reaction. This method is known as the Cardiolipin method and is presently in general clinical use for the serodiagnosis of syphilis.

The Cardiolipin method has the disadvatnages previously mentioned, the most serious of which is the high incidence of biological false positive reactions with test serum samples taken from patients whose have never been infected with *Treponema pallidum*. This biological false positive reaction occurs because Cardiolipin, the antigenic substance used in this method, is not derived from the syphilitic causing agent itself.

In order to avoid the biological false positive reaction in the serodiagnosis of syphilis, various tests were developed using *Treponema pallidum* as an antigen. Typical of such tests are the *Treponema* pallidum immobilization test (abbreviated as TPI test hereinafter) which is based on the immobilization reaction of *Treponema pallidum;* the *Treponema pallidum* complement fixation test (TPCF test) which is based on the complement fixation reaction by *Treponema pallidum* antigen; and the Fluorescent Treponemal antibody test (FTA test) based on the fluorescent antibody reaction. Although all of these tests have accomplished their objective of considerably reducing the incidence of biological false positive reactions, they have not yet come into general clinical use because they are complex in their reaction techniques and require large quantities of *Treponema pallidum,* a substance derived from the testes parenchyma of rabbits. The routine serological test must be carried out on a large number of serum samples to be practical; it, therefore, must be simple in its reaction technique, and, if based on using *Treponema pallidum* as antigen, must use only small quantities of the antigenic substance. Since none of the previously mentioned tests using *Treponema pallidum* as antigen satisfy either of these essential conditons, they have not replaced the Cardiolipin method in general clinical use.

Under these circumstances, attempts were made to develop a testing method using a *Treponema pallidum* antigen, but based on a carrier agglutination reaction which is very simple in its reaction technique and therefore suitable for widespread clinical use. Basically, the carrier agglutination reaction, as applied to serological testing for syphilis, comprises reacting a *Treponema pallidum* sensitized carrier with the test serum sample. Positive or negative results of the test are determined according to the presence or absence of agglutination of the sensitized carriers occurring as the result of the reaction of the antibody in the test sample with the *Treponema pallidum* antigen present on the carriers. In practical application, however, this method is unreliable, since the *Treponema pallidum* carriers have a tendency to agglutinate spontaneously.

SUMMARY OF THE INVENTION

The invention provides a new, clinically practical, and extremely reliable serological test for syphilis. The method of the invention is based on a carrier agglutination reaction utilizing a *Treponema pallidum* antigen preparation and subjecting the test serum sample to treatment with a heterogenic antibody absorbent before reacting it with the antigen preparation.

A significant aspect of the invention is antigen preparation. The antigen is prepared by adsorbing *Treponema pallidum* cell components on suitable carriers and subsequently suspending the sensitized carriers in a phosphate buffered saline solution. The suspending solution also contains small amounts, respectively, of a non-ionic surface active agent, a paste and normal animal serum. The actual amount of these last mentioned ingredients present in the solution is not critical and minor variations in the amount present does not affect the operability of the antigen preparation.

The antigen preparation of the invention overcomes the spontaneous agglutination problem present in previous attempts to develop a serological test for syphilis based on the carrier agglutination of a *Treponema pallidum* antigen. Agglutination of the *Treponema pallidum* sensitized carriers used in the antigen preparation of the invention takes place only with the antibody contained in the test serum sample. The apparent reason for this lack of spontaneous agglutination is the presence of the suspending medium of the invention which prevents the *Treponema pallidum* sensitized carriers from adhering to each other. The presence of the suspending medium also has the effect of preventing the liberation of *Treponema pallidum* from the adsorption surface of the carriers.

Another significant aspect of this invention is the treatment of the test serum sample with a novel absorbent before reacting it with the antigen preparation. This treatment removes heterogenic antibodies from the serum, which, if not removed, could possibly cause a non-specific reaction with the antigen preparation.

Investigations have shown that the non-specific reaction is caused by the reaction of heterogenic antibodies present in the test serum samples with heterogenic antigenic components present in *Treponema pallidum* specimens and carriers of animal origin. More specifically, the antigenicity of *Treponema pallidum* itself consists of both pathogenically essential component and pathogenically non-essential component. Since the *Treponema pallidum* used in the method of the invention is collected from rabbits' testes, it is inevitable that the specimens collected will contain rabbits' testes components which act as heterogenic antigens. Furthermore, when the carriers used are of animal origin, they themselves act as heterogenic antigens and can react with heterogenetic antibodies present in the test serum sample, causing a biologically false positive reaction.

The present invention eliminates non-specific reactions as described above by removing the heterogenetic antibodies from the test serum sample by absorption before addition of the antigen preparation of the invention. The method of the invention inactivates the heterogenic antibodies present in the test serum sample by an antigen-antibody reaction prior to commingling the test serum sample with the antigen preparation of the invention.

The absorbent of the invention consists of a mixture of normal rabbits' testes components and non-pathogenic *Treponema pallidum* cell components suspended in a suitable medium. The suspending medium must be carefully chosen so as not to inhibit the agglutination reaction of the *Treponema pallidum* sensitized carriers in the antigen preparation. Typically, in order to avoid this inhibition problem, the suspending medium used is the same as that used in the antigen preparation of the invention.

A comparative study of the sensitivity and specificity of various tests methods and the method of the invention was made on test serum samples obtained from 100 syphilitic and non-syphilitic patients respectively, and on 8 serum samples that had given a biological false positive result. The results of this study are included in the following table.

TABLE

Results in comparative study on various test methods

| | Cardio-lipin method | | TPCF test | | TPI test | | FTA trst | | Test with the antigen preparation of this invention | | | |
|---|---|---|---|---|---|---|---|---|---|---|---|---|
| | | | | | | | | | Erythro-cyte | | Latex | |
| Results | − | + | − | + | − | + | − | + | − | + | − | + |
| Serum: | | | | | | | | | | | | |
| Syphilitic | 2 | 98 | 2 | 98 | 3 | 97 | 3 | 97 | 0 | 100 | 0 | 100 |
| Non-syphilitic | 80 | 20 | 96 | 4 | 100 | 0 | 95 | 5 | 98 | 2 | 98 | 2 |
| BFP | 0 | 8 | 7 | 1 | 8 | 0 | 7 | 1 | 8 | 0 | 8 | 0 |

As indicated in the above table, the tests with the antigen preparation of the invention (without prior treatment of the test serum sample with the absorbent of the invention) occasionally provokes a non-specific reaction. This is caused, as previously explained, by the reaction of heterogenic antibodies in the test serum sample with heterogenic antigenic components present in the *Treponema pallidum* sensitized carrier antigen preparation.

The two serum samples that gave a biologically false positive reaction when tested with the antigen preparation of the invention in the comparative study were subsequently treated with the absorbent of the invention prior to addition of the antigen preparation. Both tests resulted in a negative reaction.

In a separate experiment on 7 test serum samples that had given a non-specific reaction with the antigen preparation of the invention, the same results were obtained. All 7 samples gave a negative reaction when treated with the absorbent of the invention prior to adding the antigen. These results are definite evidence that the heterogenic antibody absorbent of this invention inhibits nearly 100 percent of agglutination of the carriers caused by the reaction of heterogenic antigens and heterogenic antibodies in serological tests for syphilis based on the carrier agglutination reaction with pathogenic *Treponema pallidum* sensitized carriers.

Based on these comparative studies and experiments, it is apparent that the testing method of the invention is substantially more sensitive and specific than those presently in use. Additionally, it should be noted that the reaction techniques of the present method are much simpler than the conventional methods using *Treponema pallidum* itself as antigen such as the TPI test, TPCF test and FTA test. Another advantageous aspect of the testing method of the invention is that it requires substantially less *Treponema pallidum* than the conventional methods. The number of serum samples that can be tested with the *Treponema pallidum* obtained from 20 rabbits is about 600 with the TPI test, about 2,000 with TPCF test, and about 50,000 with the FTA test. Using the antigen preparation of this invention, about 200,000 serum samples can be tested with the same quantity of *Treponema pallidum*.

DESCRIPTION OF PREFERRED EMBODIMENTS

(I) The antigen preparation

The antigen preparations used in the testing method of the invention comprises a suspension of *Treponema pallidum* cell components adsorbed on suitable carriers. The suspending medium is principally a phosphate buffered saline solution, containing small non-critical amounts respectively of a non-ionic surface active agent such as polysorbate 80, animal serum such as rabbit and human sera, and a paste. The paste can be a gum such as gum arabic and tragacanth gum, a seaweed paste such as agar-agar and alginis and an animal paste such as gelatine and glue or a synthetic paste such as polyvinyl alcohol and polyvinylpyrolidone.

The concentration of *Treponema pallidum* sensitized carrier in the suspending medium is advantageously greater than 0.25%. Animal erythrocytes such as formalin and tannic acid treated sheep erythrocytes, or non-biological materials such as mono-disperse plastic latex are suitable carriers.

To prepare the *Treponema pallidum* sensitized carriers used in the antigen preparation of the invention, a concentrated suspension of *Treponema pallidum* cell components derived from syphilitic testes parenchyma of rabbits was first prepared as follows: Twenty male rabbits each weighing from 2.5–3.0 kilograms were inoculated in each testes parenchyma with $10^6$–$10^7$ cells of *Treponema pallidum*. Symptoms of acute syphilitic testitis were manifest 7–10 days after the inoculation. The rabbits were then killed by total bleeding and the testes parenchyma were aseptically collected and each was cut crosswise into 10–20 slices. These slices were then prepared for the extraction of *Treponema pallidum* by adding them to 1,000 ml. of a 0.075 sodium citrate solution and exuding at room temperature for 60 minutes. This procedure was repeated three times. *Treponema pallidum* was then separated from the exudate by first centrifuging it for 10 minutes at 500 g. The supernatant thus obtained was further centrifuged for 30 minutes at 10,000 g. The *Treponema pallidum* collected from the sediment was then suspended in 100 ml. of a phosphate buffered saline solution containing 0.005% by bovine albumin. This suspension was further subjected to sonic treatment at 10 kc./s. for 30 minutes in order to destroy the *Treponema pallidum* cells and subsequently concentrated to $\frac{1}{10}$ of its original volume by pervaporation for 24 hours in a cold room at 4°–6° using a cellophane membrane. After completion of the concentration procedure, 10 mg. of merthiolate was added to the concentrated suspension.

The carriers, upon which the *Treponema pallidum* cell components contained in the previously disclosed concentrated suspension are ultimately adsorbed, are prepared as follows. It is expedient to prepare the carriers in an amount in excess of that required in the antigen preparation since the same carriers are used in preparing the heterogenic antibody absorbent.

A typical carrier used in this invention are sheep erythrocyte carriers, which are prepared by first aseptically collecting blood from the jugular vein of a healthy sheep. The collected blood is then mixed with a 4% by weight sodium citrate solution to form a 10 parts by volume to 1 part by volume, respectively, solution. The erythrocytes are then collected by centrifugal separation at 2,500 r.p.m. for 30 minutes and washed with 10 times their volume of a physiologic saline solution. The collected and washed erythrocytes were then fixed with an equal volume of a physiologic saline solution containing 3% formalin by volume and subsequently treated with an equal volume of phosphate buffered saline solution containing from 0.0002 to 0.0001% by weight tannic acid per volume unit of erythrocytes. The treated erythrocytes are then suspended in 10 times their volume of a phosphate buffered saline solution per volume unit of erythrocytes.

The adsorption of the *Treponema pallidum* cell components contained in the previously prepared concentrated suspension onto the treated sheep erythrocyte to form *Treponema pallidum* sensitized carriers is effected as follows.

The concentrated *Treponema pallidum* suspension is first mixed with an equal volume of the sheep erythrocyte suspension. This first mixture is then added to 10 times its volume of a phosphate buffered saline solution. This second mixture is allowed to stand for 30 minutes at 37° C. to effect adsorption of the *Treponema pallidum* antigen onto the surface of the erythrocyte carriers. The *Treponema pallidum* carrying erythrocytes were then collected by centrifugal separation at the rate of 1,500 r.p.m. for 5 minutes and washed with 10 times their volume of physiologic saline solution containing 0.5% by weight gum arabic to remove excess, unadsorbed *Treponema pallidum* cell components.

Non-biological carriers such as mono disperse plastic latex may be used in place of the sheep erythrocytes, if desired. To prepare *Treponema pallidum* sensitized latex carriers, a suspension of buffer latex in 3 times its volume of borate buffer solution is initially prepared. An equal volume of this suspension is mixed with the concentrated *Treponema pallidum* solution previously prepared. This mixture is added to 5 times its volume of a borate buffer solution. The *Treponema pallidum* cell components are adsorbed onto the latex carriers by allowing this last prepared mixture to stand for 30 minutes at room temperature. The *Treponema pallidum* carrying latex is then collected by centrifugal separation at the rate of 8,000 r.p.m. for 10 minutes. The collected latex carriers were then washed with 10 times their volume of physiologic saline solution containing 0.5% by weight gum arabic in order to remove excess unadsorbed *Treponema pallidum* cell components.

The suspending medium in which the latex or animal erythrocyte *Treponema pallidum* sensitized carriers are ultimately suspended to form the antigen preparation of the invention is prepared by dissolving the following ingredients in the given concentration in a phosphate buffered saline solution. It is expedient to prepare a greater amount of this solution than is required in the antigen preparation, since the same suspending medium is typically used in the heterogenic antibody absorbent.

|  | Percent by volume |
|---|---|
| Polysorbate 80 | 0.01 |
| Purified gum arabic | 0.25 |
| Rabbits serum | 1.0 |

The antigen preparation of the invention is prepared by suspending the *Treponema pallidum* sensitized carriers, either latex or sheep erythrocyte, in 2.5% by volume of the suspending medium. This quantity of antigen preparation is sufficient for testing approximately 200,000 serum samples.

(II) The heterogenic antibody absorbent

Typically, the heterogenic antibody absorbent of the invention comprises a suspension of normal rabbits testes powder and non-pathogenic Rieter strains of *Treponema pallidum* cell components suspended in a suspending medium of the same composition as that used in preparing the antigen preparation of the invention.

The normal rabbits testes powder is prepared by first killing healthy male rabbits by total bleeding, collecting the testes and slicing them. The testes slices are then washed with purified water several times and subjected to homogenization with 2 parts by weight of physiologic saline solution for each part by weight of physiologic saline solution for each part by weight of testes slices to form an emulsion. The testes components are then precipitated from the emulsion by the addition of acetone. The precipitate is then repeatedly treated with physiologic saline solution and acetone alternately, and finally dried by acetone treatment to obtain its powdered form.

The non-pathogenic *Treponema pallidum* cell components are obtained by inoculating Rieter strains of *Treponema pallidum* into a culture medium comprising the basic medium containing peptone, yeast extract and distilled water plus human serum in 10% by volume concentration. A layer of liquid paraffin is applied to this medium and it is incubated at 35°–37° C. for one week. When the incubation was completed *Treponema pallidum* cells were harvested by centrifugal reparation. The collected *Treponema pallidum* cells were then destroyed by suspending them in a saline solution and subjecting the suspension to sonic treatment at 10 kc./s. for 30 minutes. The suspension was then subjected to centrifugal precipitation to obtain the protein fraction. A 10% by weight stock solution of protein fraction is then prepared in a phosphate buffered saline solution, or in the culture medium.

In preparing an absorbent for use in conjunction with an antigen preparation utilizing sheep erythrocytes as a carrier, the purified rabbits testes powder, and the suspension of the Reiter strain *Treponema pallidum* cell components are mixed with sheep erythrocytes as prepared for adsorption of the pathogenic *Treponema pallidum* cell components in the antigen preparation.

These ingredients are mixed in the ratio of 1:2:40 by weight respectively. Finally, to prepare the absorbent of the invention, this mixture is suspended in a suspending medium of the same composition as that used for suspending the *Treponema pallidum* sensitized carriers in preparing the antigen preparation of the invention to a 1% by volume composition.

When latex carriers are used in the antigen preparation of the invention, it is advantageous to also use latex carriers in the absorbent preparation. An absorbent preparation utilizing latex carriers is prepared in the same manner as the previously described absorbent using sheep erythrocytes as carriers except that the normal rabbits' testes powder and the Reiter strain *Treponema pallidum* solution are mixed with latex carriers in the same ratio as that disclosed for the erythrocyte carrier absorbent. This mixture is then suspended in the suspending medium in a concentration of 1% by volume.

The serological test of the invention is a long sought after serodiagnostic technique that can potentially replace the widely used relatively inaccurate Cardiolipin testing method for syphilis. The method of the invention, as borne out by the comparative study previously discussed, is substantially more sensitive and selective than the most popular tests in use today. In addition to the accuracy of the method of the invention, it has the great advantage of being based on a carrier agglutination reaction which is simple to perform on a large scale basis.

The invention includes innovations in the serodiagnosis of syphilis that contribute substantially to the effectiveness and practicality of the testing method of the invention. The antigen preparation of the invention is based on using cell components of *Treponema pallidum* as an antigenic substance, which results in a very sensitive serological test, and is suitable for use in a carrier agglutination reaction, which is very simple in its clinical technique. The antigen preparation of the invention also solves the spontaneous agglutination problem of *Treponema pallidum* sensitized carriers that rendered prior attempts to develop serological tests for syphilis using a *Treponema pallidum* antigen and based on a carrier agglutination reaction impractical.

The invention also includes an innovation that substantially increases the selectivity of the test, thereby reducing to an inconsequential level or entirely eliminating the biological false positive reaction that has been characteristic of serological tests for syphilis. This innovation includes the inactivation of heterogenic antibodies present in the test serum sample, eliminating their availability for reacting with heterogenic antigens present in the antigen preparation of the invention and provoking a biological false positive reaction. The heterogenic antibodies in the test serum sample are inactivated in accordance with one aspect of the invention by treating the test serum sample with the absorbent of the invention prior to commingling with the antigen preparation of the invention. The invention therefore provides a simple, accurate and economical serological test for syphilis that is practical for clinical use on a large scale.

It should be understood that the specific examples described in the foregoing specification are representative only, and variations in the materials and procedures used can be made without departing from the clear teachings of the disclosure and spirit of the invention. Reference should therefore be made to the appended claims in determining the full scope of the invention.

We claim:

1. An antigen preparation for use in the carrier agglutination test for syphilis which comprises (a) cell components of *Treponema pallidum* adsorbed on sheep erythrocyte carriers; and (b) a phosphate buffered saline solution containing approximately 0.01% by volume of polysorbate 80, approximately 0.25% by weight of gum arabic, and approximately 1.0% by volume of normal rabbit's serum, (c) the adsorbed cell components of *Treponema pallidum* being suspended in the phosphate buffered saline solution in a concentration greater than about 0.25% by volume.

2. The antigen preparation of claim 1, wherein (a) the concentration of adsorbed cell components of *Treponema pallidum* in said suspending medium is about 2.5 percent by volume.

References Cited

UNITED STATES PATENTS

| | | | |
|---|---|---|---|
| 2,709,670 | 5/1955 | Ichelson | 424—13 |
| 2,892,755 | 6/1959 | Portnoy | 424—13 |
| 3,088,875 | 5/1963 | Fisk | 424—12 |
| 3,096,250 | 7/1963 | Ingraham | 424—12 |

OTHER REFERENCES

Serologic Tests for Syphilis, 1964 manual, pp. 13–14.

Burrows: Textbook of Microbiology, 1963, pp. 845–846.

The Merck Index, 1960, pp. 2–3.

ALBERT T. MEYERS, Primary Examiner

N. A. DREZIN, Assistant Examiner